Oct. 1, 1957     A. W. TRONNIER     2,807,983
FIVE COMPONENT HIGH SPEED OBJECTIVE OF MODIFIED GAUSSIAN TYPE
Filed Nov. 14, 1955
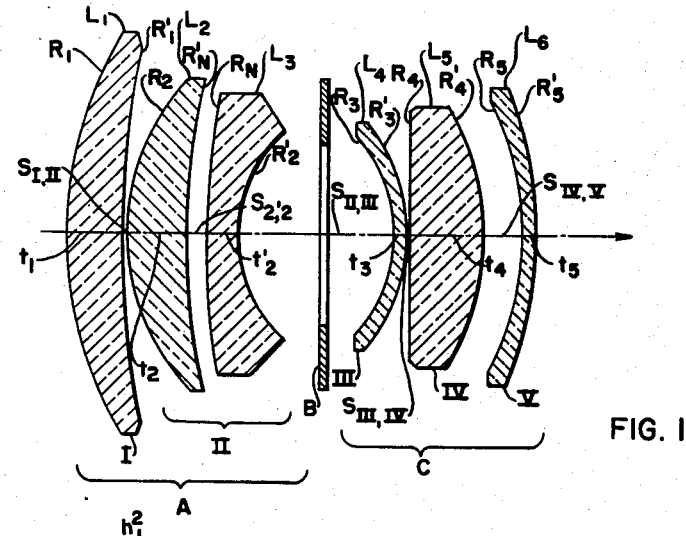
FIG. 1
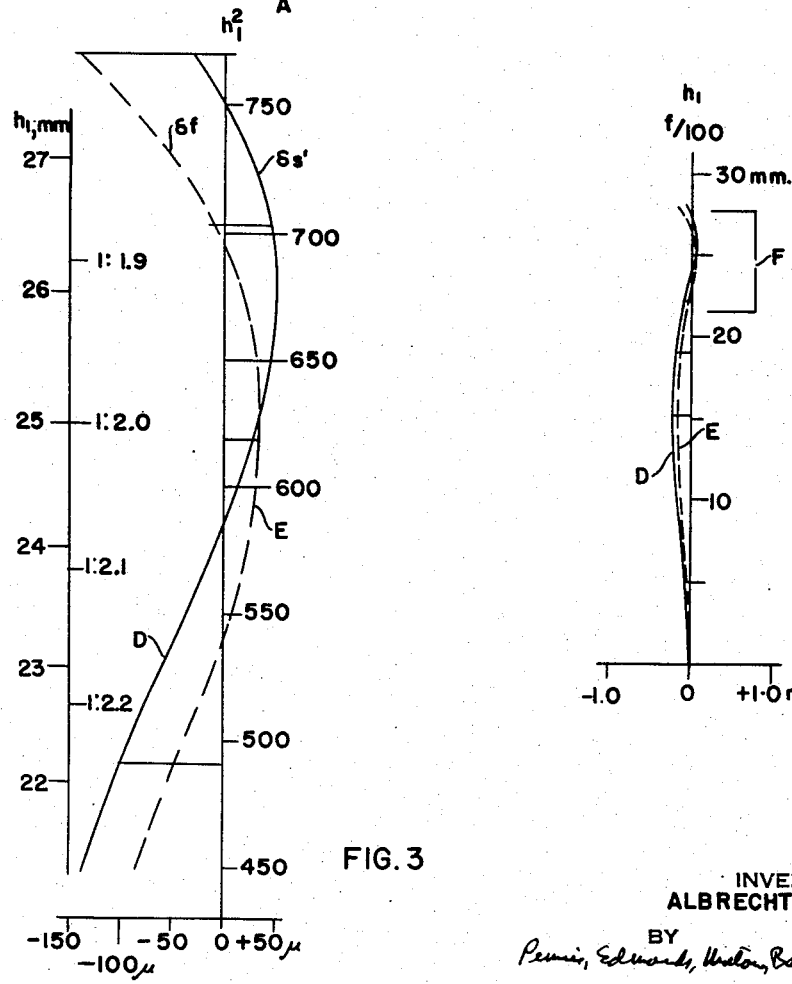
FIG. 3     FIG. 2
INVENTOR
ALBRECHT W. TRONNIER
BY
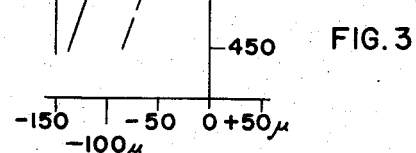
ATTORNEYS United States Patent Office
2,807,983
Patented Oct. 1, 1957

2,807,983

FIVE COMPONENT HIGH SPEED OBJECTIVE OF MODIFIED GAUSSIAN TYPE

Albrecht Wilhelm Tronnier, New York, N. Y., assignor to Farrand Optical Co., Inc., New York, N. Y., a corporation of New York Application November 14, 1955, Serial No. 546,382

12 Claims. (Cl. 88—57)

This invention relates to a high speed six-element lens for photographic purposes having a relative aperture of $f/2$ or greater and a useful field on the object side of from 42° to 48°, corresponding to an image diameter between 75% and 85% of the focal length.

High speed objectives having apertures and fields of this order of magnitude are now well known, either as variations of the Gaussian type objectives with distorted symmetry or with small asymmetry, or else as developments of the triplet type with a strongly asymmetric form from front to back. These known systems however possess disturbing residual aberrations of undesirable magnitude which of course afflict slower objectives of the same useful field angle only to a much smaller degree.

Analysis of this inferiority of high speed with respect to slow objectives always indicates substantially the same sources. In high speed objectives, and for bundles of large aperture, noticeable trouble is experienced in the imaging of both axial and off-axis points with those residual aberrations which in slower systems can usually be disregarded. With lenses derived as variations of the Gaussian type these troublesome errors usually include:

A. Excessive zonal variation in the spherical aberration of the focal length.

B. For high aperture bundles, excessive over-correction of coma in both extremes of the aperture—despite the use of glasses of the highest index.

C. Substantial residual sagittal coma and mixed skew aberrations.

In variations on the triplet type it is usual to encounter in the working out of the spherical and particularly the spherochromatic corrections excessive residual aberrations even for marginal rays and also general zonal intermediate errors which cannot be eliminated. Likewise such residual aberrations are encountered in the intersection distances and in the focal lengths. Simultaneously there appear a disturbing residual astigmation and substantial asymmetries in the coma correction which give to the image those comatic flares or tails which, according to the direction of such asymmetry, are called inward or outward coma and which so seriously impair the definition and contrast in the lateral portions of the field.

Most attempts to achieve substantial improvements in the objectives hitherto available have failed in view of the fact that partial success in reduction of residual aberrations of one type was accompanied by substantial increase in the residual aberrations of another type. Thus improvement in the total error was not obtained.

In contrast with these prior attempts, which sought to achieve a substantial improvement over the prior art by changes in the distribution of the residual aberrations of a given objective, the present invention strikes an entirely different course which leads to the goal in and astonishingly simple manner. Instead of beginning with a high speed system of known type, the present invention proposes to develop a new objective of moderate speed which possesses not only the same favorable imaging properties as do other slow systems but which can be provided with small residual aberrations of high order and appropriate sign. With this basic design it is possible in the carrying out thereof according to the invention to increase the aperture up to $f/2$ and beyond, e. g. to approximately $f/1.8$ while retaining those capacities for correction for the whole field of view which are characteristic of slow systems with their small apertures.

This concept has led to the objective of the present invention, the physical form of which can be considered as a novel modification of the Gaussian type.

In the accompanying drawings Fig. 1 is an axial section through an objective according to the invention, and Figs. 2 and 3 are graphs useful in explaining the properties of the objectives of the invention.

In the objectives of the invention a front group A (Fig. 1) of Gaussian type presented to the long conjugate side of the system is followed by the diaphragm space which possesses the form of a biconvex lens. Behind the diaphragm space on the short conjugate side there is provided a convergently operating rear group C of characteristic new form. The front group A includes a front component I which possesses the form of a convergent meniscus element $L_1$ convex to the long conjugate. It also includes a doublet II convex in the same direction but having an over-all negative power. This doublet is made up of a positive lens element $L_2$ having surfaces of unequal curvatures and of a divergent lens element $L_3$, likewise of unequal surface curvatures, disposed adjacent the diaphragm. Then follows the diaphragm B enclosed within the biconvexly shaped diaphragm space. On the short conjugate side this diaphragm space is limited by the rear group C which has an over-all positive power. This group is so designed according to the invention that the diaphragm space is limited by a divergent component III having the form of a negative meniscus element $L_4$ concave toward the diaphragm. Component III is followed by a positive component IV comprising an element $L_5$ of unequal curvatures and of very high power. Between components III and IV there is enclosed an air space having the shape of a divergent lens of unequal curvatures. Component IV presents its more strongly curved rear surface to the following air space which has the shape of a divergent meniscus lens. This air space acts as a convergent air lens and is limited on the short conjugate side of the system by the lens component V, the last element of the lens. Component V is shaped as a negative meniscus element $L_6$ concave toward the diaphragm.

The rear group C which follows the diaphragm is so constructed that at its front and rear limits two divergent meniscus components III and V which are concave toward the diaphragm enclose two convergently operating air lenses which are of divergent lens shape. Between these two air lenses is arranged the convergently operating inner component IV of unequal surface curvatures. It is component IV which gives to the rear group C its over-all positive power.

The new objective type according to the invention can thus be represented according to the following scheme:

(1)

| Component | I | II | B | III | IV | V |
|---|---|---|---|---|---|---|
| Number of Elements | 1 | 2 | Diaphragm | 1 | 1 | 1 |
| Shape of the intervening air space | N | | P | | N | N |
| Component type | +M | −D | Diaphragm | −M | +U | −M |

In this tabulation the numerals I—V identify the components, beginning at the long conjugate side of the system. The numbers in the second row indicate the number of lens elements in each of these components. The letters N and P indicate the negative or positive geometrical shape of the air spaces in the third row, and the plus and minus signs in the fourth row indicate the signs of the powers of the components in whose columns they appear. D and M respectively refer to doublet and to meniscus components whereas the letter U indicates a component having unequal curvatures for its front and rear surfaces.

The lenses of the invention can be described by a criterion whose application permits achievement not only of the high relative aperture and high degree of correction which characterize the lenses of the invention but also the achievement thereof via lens shapes which can be readily manufactured—a matter of particular importance with respect to the exterior meniscus components I and V. This criterion makes it possible to develop objectives of simple manufacturing requirements and assists in avoiding strong curvatures and excessively close tolerances on the lens thicknesses. This prescription on the elements of the lens can be given either in terms of "shaping" thereof by means of the well known shape factor $\sigma$, or in a particularly simple and satisfactory fashion in terms of the sums of the radii taken as multiples of the focal length. With respect to the shape factor $\sigma$ see I. C. Gardner, "Application of the Algebraic Aberration Equations to Optical Design," Bureau of Standards Scientific Paper No. 550, page 82, Washington, 1927. The form of representation in terms of radii sums is particularly advantageous for meniscus-shaped elements inasmuch as the shape factor $\sigma$ for sharply curved meniscus lenses approaches the limiting value of infinity, assuming this value for lenses of zero power independently of their physical shape. Data in terms of radii sums with respect to focal lengths are not subject to this difficulty.

Let the sum of the two exterior radii of the front component I be designated $RS_I$. Similarly let that for the meniscus-shaped air lens between components IV and V be designated $RS_{IV,V}$ while that of the negative meniscus component V is denoted $RS_V$. With this notation the form of the meniscus-shaped components of lenses of the invention may be specified as follows:

For the convergent front meniscus I:

$$155\% \ f < RS_I < 310\% \ f \qquad (2)$$

For the meniscus-shaped convergent air lens between components IV and V:

$$50\% \ f < -RS_{IV,V} < 120\% \ f \qquad (3)$$

and for the negative meniscus V on the image side of the system:

$$65\% \ f < -RS_V < 165\% \ f \qquad (4)$$

These inequalities establish (in terms of the equivalent focal length $f$ of the entire objective) quantitative limits for the sums of the radii of these three components, which are farthest removed from the diaphragm position and which therefore exhibit the greatest separation from the entrance and exit pupils of the system, respectively.

As above indicated, the properties of the objectives of the invention just stated in relations (2), (3) and (4) in terms of the relation of radii sums to focal lengths may also be given in terms of the shape factor $\sigma$, defined by Gardner in the expression:

$$\sigma = \frac{R'+R}{R'-R} \qquad (5)$$

Here R is the front and R' is the rear radius of the component under consideration; $\sigma$ is therefore a dimensionless number. In terms of $\sigma$ the objectives of the present invention are therefore characterized as follows:

$$+1.50 < \sigma_I < +3.00 \qquad (6)$$

$$+2.0 < \sigma_{IV,V} < +20.0 \qquad (7)$$

$$+4.0 < \sigma_V < +10.0 \qquad (8)$$

In relations (6), (7) and (8) $\sigma_I$ and $\sigma_V$ denote the shape factor, in Gardner's terminology, of the first and last components, and $\sigma_{IV,V}$ denotes the shape factor of the last air lens contained between the positive component IV and negative component V. In the lenses according to the present invention these three characteristic inequalities all pertain to positive values. This indicates that in each of the three inequalities (6), (7) and (8) the rear radius R' of the component in question is larger than its front radius R.

In the course of the investigations leading to the present invention it further appeared that the dimensioning of the strongly convergently operating rear surfaces of the elements III, IV and V of the rear assembly C, which surfaces are concave toward the diaphragm, are in their progression from the diaphragm toward the short conjugate side of decisive significance for the design of a technically feasible lens having very small zonal residuals of spherical aberration and coma, consistently with the desired high speed. For this purpose there apply the following dimensional criteria, consistent with those already given in relations (2) to (8):

$$R'_3 < R'_4 < R'_5 \qquad (9)$$

$$1.0 \ R'_3 < R'_4 < 1.8 \ R'_3 \qquad (10)$$

$$1.5 \ R'_3 < R'_5 < 3.3 \ R'_3 \qquad (11)$$

These surfaces are thus given progressively increasing radii of curvature, beginning at the diaphragm and progressing toward the short conjugate end of the system.

In the hitherto known versions of the Gaussian objective the last internal air space on the image or short conjugate side of the system has the shape of a negative lens only when this air space is limited by a convergent lens element. In these prior art systems the entire rear group consists usually of only two elements. The first of these elements is divergent and the following air lens possesses either a plano-concave shape (German Patent No. 439,556) or else a biconcave shape (U. S. Patent No. 2,106,077). In a few exceptional cases where the last convergent element is a positive meniscus, the air lens preceding it has been given the shape of a negative meniscus, as in U. S. Patent No. 2,649,023. As soon however as a divergent lens component is provided at the image end of these Gaussian variations, it has always been that the last air lens was positive in shape and usually had by itself a negative power. See the Biogon lens of L. Bertele (British Patent No. 459,739) or the Ultragon lens of the present applicant (U. S. Patent No. 2,670,659). A variation of the Gaussian objective with a three-element rear assembly whose last element is a negative meniscus (U. S. Patent No. 2,677,989) possesses in contrast to the objectives of the invention (although consistently with the state of the art otherwise) a last air space having the shape of a positive lens element. A. Warmisham has given in British Patent No. 398,307 a seven-element objective whose rear component is constituted by a doublet in the form of a negative meniscus preceded by an air lens having the shape of a negative meniscus. In contrast to the invention however this air lens of Warmisham has negative power. This proposal of Warmisham relates to a zoom lens of variable focal length whose construction is entirely different from that of the lenses of the invention, as might be expected from the fundamentally different purpose for which it is intended.

It has appeared in investigations concerning the limits to which the performance of the new lenses of the invention might be pushed that by a particularly careful stretching of the meridional image surface a distinct improvement in definition may be achieved in the lateral portions of the field, superior even to that of slower objectives, without resort to unfavorable constructional forms or choice of glasses. Consistently with the essential properties of the lenses of the invention already given this improvement is achieved by a particular balancing between the radius of the rear surface of the last element of the front group and the radius of the front surface of the last element of the rear group. These two surfaces possess in the nomenclature here employed radii $R'_2$ for the last surface of the front group (facing the diaphragm) and $R_5$ for the divergent front surface of the last element of the rear assembly. These surfaces are related by the following characteristics inequality:

$$1.25R'_2 < -R_5 < 3.00R'_2 \quad (12)$$

Adherence to this criterion makes possible this edge field improvement in the image-forming properties of the objectives of the invention without the introduction of extreme curvatures into the rear group.

The avoidance of extreme curvatures in the rear group together with the improvement in edge field definition so achieved led finally to investigation of the possibility of using sufficiently large diameters for the outer lens elements of the front and rear groups of the system as a means of increasing the illumination out to the edge of the field by reduction of the vignetting otherwise commonly encountered. These investigations have shown that such a supplementary improvement can be achieved if it is possible to hold to relatively small values the comatic errors, particularly in comatic bundles of large cross section. The invention opens a way to practical achievement of this result in the objectives of the present invention. According to this feature of the invention, by the introduction of a specific shape factor relation between the most powerful optical surfaces of the front component I and those of the following doublet II, there may be imposed on the comatic ray path such partial aberrations in the course of its passage through the front assembly that these partial aberrations can be just balanced out by the compensative action of the rear assembly. In most known objectives this cannot be achieved to a sufficient degree, so that the comatic compensation is either insufficient or excessive, with the result that the partial comatic aberrations imposed upon the ray pencils or bundles in their passage through the front assembly cannot be sufficiently well compensated upon their passage through the rear assembly. In contrast, such satisfactory treatment of aberrations in the front group of the lenses of the invention is made possible by adherence to the additional criterion according to the invention now to be given, in terms of the ratio between the front radius $R_1$ of the convergent front meniscus to the front radius $R_2$ of the divergent doublet II on the one hand and in terms of the ratio of $R_1$ to the rear radius $R'_2$ of the doublet on the other hand. In the lenses of the invention, these ratios lie within the following ranges of numerical values:

$$1.50 < \frac{R_1}{R_2} < 2.50 \quad (13)$$

$$2.33 < \frac{R_1}{R'_2} < 3.33 \quad (14)$$

In the form of fractions, relations (13) and (14) may be rewritten:

$$\frac{3}{2} < \frac{R_1}{R_2} < \frac{5}{2} \quad (15)$$

$$\frac{7}{3} < \frac{R_1}{R'_2} < \frac{10}{3} \quad (16)$$

It is possible to specify conversely that $R_2$ should lie between 40.0% and 66.7% of $R_1$ and that $R'_2$ should lie between 30.0% and 42.86% of $R_1$. This makes possible the supplementary improvement in edge field illumination under consideration without requiring the introduction, as hitherto, of auxiliary surface pairs of positive power such as cemented surfaces of positive power.

Three numerical examples of objectives according to the invention will now be described. These examples embody the properties of the invention concerning the dimensioning of the lens shapes as to distribution of radii and shape factors which have been thus far discussed. In addition, these examples embody as a further feature of the invention a distribution of powers within the system such that the sums of the surface powers of the individual components I—V conform to the following inequalities:

$$0.5\Phi < \phi_I < 1.0\Phi \quad (17)$$
$$1.0\Phi < -\phi_{II} < 2.0\Phi \quad (18)$$
$$0.3\Phi < -\phi_{III} < 0.8\Phi \quad (19)$$
$$1.4\Phi < \phi_{IV} < 2.8\Phi \quad (20)$$
$$0.2\Phi < -\phi_V < 0.7\Phi \quad (21)$$

Here $\Phi$ is the equivalent power of the entire objective and—in the usual notation—$\phi_x$ is the sum of the surface powers $\phi_x$ and $\phi'_x$ of the two exterior glass-air interfaces of radii $R_x$ and $R'_x$ of the component identified by subscript $x$, $R_x$ referring to the front surface and $R'_x$ referring to that presented to the short conjugate side of the system. The subscript $x$ refers to the positional numbers of the individual components I—V, beginning with the first component I on the long conjugate side of the system. The individual surface powers are computed from the well-known formula $$\phi_x = (n'_x - n_x)/R_x \quad (22)$$

in which $R_x$ is the radius of curvature of the surface, and $n_x$ and $n'_x$ are respectively the indices of refraction for the media preceding and following it.

The tables given below which are entitled Example 1, Example 2 and Example 3 set forth numerical data on the three examples of the lens of the invention above mentioned. In these tables, and as indicated in Fig. 1, radii identified by the letter $R$ with successive subscripts but without prime indication are successively the radii of the front surfaces of the components, i. e. the surfaces presented to the long conjugate side of the system. Radii identified by $R'$ with similar subscripts are those of the rear faces of the components. The order of subscripts is that of the components, beginning at the long conjugate end of the system.

The pair of adjacent surfaces enclosed within the doublet II are identified by the radii $R'_N$ and $R_N$. $R'_N$ thus refers to the rear surface of $L_2$, the first element of the doublet and $R_N$ refers to the front surface of $L_3$, the strongly divergent element of this doublet adjacent to the diaphragm space. The air space enclosed by this pair of adjacent surfaces within the doublet is designated $s_{2'2}$ while the axial thicknesses of the lens elements are identified by the letter $t$ with Arabic subscripts corresponding to the numbering of the components to which they below, $t_2$ and $t'_2$ being respectively the thicknesses of the first and second elements $L_2$ and $L_3$ of the doublet II. The axial spacings of the components are indicated by the letter $s$, with the Roman subscripts of the preceding and following components. The glasses cited in the examples, which are commercially available, are identified as to Abbe numbers and as to index of refraction $n$ with respect to the yellow helium line $d$ of 5876 Angstroms.

The lens of Example 1 is an objective of relative aperture $f/2$ and of 1.679 inches focal length. Its dimensions are given in inches, and its front radius $R_1$ possesses a value of exactly one inch, a unit of measure in terms of which the other dimensions are also expressed. Consequently the interrelationship of the radii can be directly read from this table without computation.

Example 1

(All dimensions in inches)

[Equivalent focal length $f=1.679$ in. Relative aperture $f/2$.]

| Component | Lens | n | ν | Radii | Thickness t or Spacing s |
|---|---|---|---|---|---|
| I | $L_1$ | 1.7170 | 47.9 | $R_1=+\ 1.0000$ | $t_1=0.15245$ |
|   |       |        |      | $R'_1=+\ 2.7092$ | $s_{I,II}=0.00175$ |
| II | $L_2$ | 1.6935 | 53.5 | $R_2=+\ 0.5744$ | $t_2=0.15245$ |
|    |       |        |      | $R'_N=+\ 1.7230$ | $s_{2,'2}=0.06352$ |
|    | $L_3$ | 1.7274 | 28.4 | $R_N=+\ 2.1169$ | $t'_2=0.07210$ |
|    |       |        |      | $R'_2=+\ 0.3589$ Diaphragm | $s_{II,III}=0.39384$ |
| III | $L_4$ | 1.6034 | 38.0 | $R_3=-\ 0.3762$ | $t_3=0.03811$ |
|     |       |        |      | $R'_3=-\ 0.4756$ | $s_{III,IV}=0.00175$ |
| IV | $L_5$ | 1.7130 | 53.9 | $R_4=-27.060$ | $t_4=0.19691$ |
|    |       |        |      | $R'_4=-\ 0.6071$ | $s_{IV,V}=0.08957$ |
| V | $L_6$ | 1.6034 | 42.5 | $R_5=-\ 0.7484$ | $t_5=0.02954$ |
|   |       |        |      | $R'_5=-\ 1.0116$ |   |

In this example the radius of the last air-glass surface on the image side of the objective is somewhat larger than the front radius $R_1$.

Conformably with the characteristic features of the invention set out in relations (2), (3) and (4), the lens of Example 1 exhibits the following properties:

$$RS_I = R_1 + R'_1 = +3.7092 = 220.9\% \ f$$
$$155\% \ f < 220.9\% \ f < 310\% \ f$$
$$RS_{IV,V} = R'_4 + R_5 = -1.355 = -80.7\% \ f$$
$$50\% \ f < +80.7\% \ f < 120\% \ f$$
$$RS_V = R_5 + R'_5 = -1.7600 = -104.8\% \ f$$
$$65\% \ f < +104.8\% \ f < 165\% \ f$$

Moreover, in the terminology of Gardner, the shape factors $\sigma$ of Example 1 conform to the relation (6), (7) and (8) as follows:

$\sigma_I = 2.1701$, which is between 1.50 and 3.00.
$\sigma_{IV,V} = 9.5931$, which is between 2.0 and 20.0.
$\sigma_V = 6.6869$, which is between 4.0 and 10.0.

The convergently operating rear faces $R'_3$, $R'_4$ and $R'_5$ of the three components of the rear assembly increase successively in radius values as specified by relation (9) inasmuch as $$-0.4756 < -0.6071 < -1.0116$$

Moreover $R'_4$ (−0.6071) is between $R'_3$ (−0.4756) and 1.8 $R'_3$ (−0.8561). Also $R'_5$ (−1.0116) is between 1.5 $R'_3$ (−0.7134) and 3.3 $R'_3$ (−1.5695) as specified in relations (10) and (11).

The surface $R_5$ which closes the last convergently operating air lens possesses a radius −0.7484 which in absolute value is between 1.25 and 3.0 times that of the radius $R'_2$ as specified by relation (12). This is true since 1.25 $R'_2 = 0.4486$ and since 3.0 $R'_2 = 1.0767$. Moreover $R_1/R_2 = 1.74095$ and $R_1/R'_2 = 2.78630$. Consequently the further conditions of relations (13) and (14) are fulfilled, since:

$$1.50 < 1.74095 < 2.50$$
and
$$2.33 < 2.78630 < 3.33$$

In percentage terms $R_2$ is between 40% and 66.7% of $R_1$, and $R'_2$ is between 30% and 42.86% of $R_1$.

It should be emphasized that in view of the high speed of the objectives of the invention the thicknesses of the lens components must be sufficiently specified so that on the one hand the negative components will have an axial thickness sufficient for strength and ready manufacture, whereas for the positive components the thicknesses must provide at the lens margins cylindrical surfaces appropriate to the lens diameters. This is necessary for reasons of manufacture. On the other hand care must be taken with respect to all thicknesses and spacings to avoid excess therefor. Otherwise the length of the objective in relation to the diameter of its openings will be unnecessarily increased with consequently increased vignetting. Since reduction of vignetting is also an object of the present invention, there will be given appropriate suggestions for dimensioning of the lens thicknesses and spacings. First however the shape of the components of the objective should conform in round terms to the following specifications:

$$R_1 = 1 \ (\text{UNITY})$$
$$2.0 R_1 < R'_1 < 5.0 R_1$$
$$.40 R_1 < R_2 < .667 R_1$$
$$R_1 < \pm R'_{N,N} < \infty$$
$$.30 R_1 < R'_2 < .4286 R_1$$

DIAPHRAGM $$.30 R_1 < -R_3 < .48 R_1$$
$$.36 R_1 < -R'_3 < .60 R_1$$
$$3.3 R_1 < \pm R_4 < \infty$$
$$-R'_3 < -R'_4 < .75 R_1$$
$$-R'_4 < -R_5 < R_1$$
$$.75 R_1 < -R'_5 < 1.50 R_1$$

Having regard to the precaution above suggested with respect to proportioning of the lens thicknesses and spacings, the objective of Example 1 has been constructed with the following values:

| | |
|---|---|
| $R_1 = +1.0$ | $t_1 \cong 0.15$ |
| $R'_1 = +2.7$ | $s_{I,II} < 0.1$ |
| $R_2 = +\ .57$ | $t_2 \cong 0.15$ |
| $R'_N = +1.7$ | $s_{2,'2} < 0.1$ |
| $R_N = +2.1$ | $t'_2 < 0.1$ |
| $R'_2 = +\ .36$ | $s_{II,III} \cong 0.4$ |
| $R_3 = -\ .38$ | $t_3 < 0.1$ |
| $R'_3 = -\ .48$ | $s_{III,IV} < 0.1$ |
| $R_4 = $ long | $t_4 \cong 0.2$ |
| $R'_4 = -\ .60$ | $s_{IV,V} < 0.2$ |
| $R_5 = -\ .75$ | $t_5 < 0.1$ |
| $R'_5 = -1.0$ | |

Here again dimensions are given with reference to a unity value for the front radius $R_1$ of the positive meniscus component I. With the readily available glasses specified in Example 1 the equivalent focal length of this lens is approximately $f=1.7$ units.

The relative aperture customarily used for the objective of Example 1 is $f/2.0$. Consequently the desired high speed is shown to have been achieved. Moreover the high degree of correction of the slower objectives is also retained. Indeed in some respects it is substantially improved. From the results of a rigorous trigonometric computation the significant advance achieved by the present invention is strikingly evident. This will be apparent from the following examples of numerical data:

1. For a principal ray having on the object side an inclination of $\omega_0 = 20°\ 47'\ 30''$, the astigmatism is exactly zero. Consequently the new objective is a genuine anastigmat.

2. The field correction of this objective is so improved that the desired reduction of the zonal curvature of the meridional image surface in the outer portions of the field is realized. The new objective makes it possible to press this improvement so far that the residual aberrations are measured in a few hundred thousandths of the equivalent focal length, as in the case of the optical systems for large astronomical telescopes, instead of in hundredths or thousandths of the focal length as hitherto customary.

Consequently for use with the lenses of the invention a unit of aberration measure $A = 1 \times 10^{-5}\ f$ may be adopted.

The zonal differences $\delta_{zm}$ in the curve of the meridional image surface relative to the meridional focal point for a principal ray of 21.6500° inclination in the object space are given in the following table:

| $\omega_0$ | $\delta_{zm}$ |
|---|---|
| 21.6500° | 0 |
| 17.7872° | −19.9A |
| 12.5809 | −78.5A |

3. The desired reduction in spherical aberration of focal lengths is achieved. For the lens of Example 1 this zonal aberration $\delta_{zt}$ has a maximum value of only −58.6A where the actual values of the spherical aberration of the focal lengths $\delta_t$ are only −16.1A and −74.7A for incident ray heights of 0.26290 $f$ and 0.19859 $f$, respectively, corresponding to relative apertures of $f/1.90$ and $f/2.52$.

4. The residual departure $\delta_{scc}$ from the sine coincidence condition amounts in the zone of maximum spherical aberration to $\delta_{scc} = 67.1A$ only. This is for an incident ray height $h_1 = 0.19859\ f$. In these expressions A is the above-mentioned unit of aberration measure, amounting to one one hundred thousandth of the equivalent focal length $f$.

*Example 2*

(All dimensions in millimeters)
[Equivalent focal length $f$=100 mm. Relative aperture $f/1.9$.]

| Component | Lens | $n$ | $\nu$ | Radii | Thickness $t$ or Spacing $s$ |
|---|---|---|---|---|---|
| I | $L_1$ | 1.7170 | 47.9 | $R_1 = +\ 59.606$ | $t_1 = 9.087$ |
|   |   |   |   | $R'_1 = +161.485$ | $s_{I,II} = 0.104$ |
| II | $L_2$ | 1.6910 | 54.8 | $R_2 = +\ 34.105$ | $t_2 = 9.021$ |
|   |   |   |   | $R'_N = +102.703$ | $s_{2,'2} = 3.786$ |
|   |   |   |   | $R_N = +126.178$ |   |
|   | $L_3$ | 1.7274 | 28.4 | $R'_2 = +\ 21.393$ Diaphragm | $t'_2 = 4.297$ |
|   |   |   |   |   | $s_{II,III} = 23.475$ |
| III | $L_4$ | 1.6034 | 38.0 | $R_3 = -\ 22.424$ | $t_3 = 2.272$ |
|   |   |   |   | $R'_3 = -\ 28.350$ | $s_{III,IV} = 0.104$ |
| IV | $L_5$ | 1.7130 | 53.9 | $R_4 = -1612.96$ | $t_4 = 11.737$ |
|   |   |   |   | $R'_4 = -\ 36.188$ | $s_{IV,V} = 5.339$ |
| V | $L_6$ | 1.6034 | 42.5 | $R_5 = -\ 44.612$ | $t_5 = 1.761$ |
|   |   |   |   | $R'_5 = -\ 60.297$ |   |

The paraxial back focal length $p'_0$ is 50.725 mm. in the lens of Example 2.

The lens of Example 2 exhibits the following properties:

$$RS_I = +221.091\%\ f$$
$$RS_{IV,V} = -80.800\%\ f$$
$$RS_V = -104.909\%\ f$$

as required by relations (2), (3) and (4). Further:

$$\delta_I = +2.1701$$
$$\delta_{IV,V} = +9.5916$$
$$\delta_V = +6.6885$$

wherein $\delta_I$, $\delta_V$ and $\delta_{IV,V}$, respectively, denote the shape factor $\delta$ as above defined for the first and last components I and V, and for the air lens contained between the positive component IV and the negative component V. These values lie within the limits established by relations (6), (7) and (8). Moreover the progression of radii at the convergent rear surfaces $R'_3, R'_4$ and $R'_5$ of the rear assembly is as follows:

$$-28.350 < -36.188 < -60.297$$

as required by relation (9).

In particular:

$$R'_4 = 1.2764\ R'_3$$

and $$R'_5 = 2.1269\ R'_3$$

as required by relations (10) and (11).

In the front group:

$$R_1/R_2 = 1.7477$$

and $$R_1/R'_2 = 2.7862$$

as specified by relations (13) and (14).

Alternatively stated:

$$R_2 = 57.2174\%\ R_1$$
$$R'_2 = 35.8907\%\ R_1$$

The absolute values of the radii $R_5$ and $R'_2$ are related as 44.612/21.393. Hence $$|R_5| = 2.0854\ R'_2$$

Corresponding to an equivalent focal length of 100 mm. the total power $\Phi$ of the lens of Example 2 is +10.0 diopters. The surface powers $\phi$ of each surface is given by the relation $\phi = 1000(n'-n)/R$ in which R is the radius of curvature, in millimeters, of the surface in question and $n$ and $n'$ are respectively the indices of refraction of the media preceding and following the surface. In the lens of Example 2 the surface powers are distributed as follows (all values in diopters):

| $\phi_1 = +12.029$ | $\phi'_1 = -\ 4.440$ |   | $\phi_I = +\ 7.589$ |
|---|---|---|---|
| $\phi_2 = +20.261$ | $\phi'_N = -\ 6.728$ | $\phi_2 + \phi'_N = +13.533$ | $\phi_{II} = -14.705$ |
| $\phi_N = +\ 5.765$ | $\phi'_2 = -34.003$ | $\phi_N + \phi'_2 = -28.238$ |   |
| $\phi_3 = -26.908$ | $\phi'_3 = +21.284$ |   | $\phi_{III} = -\ 5.624$ |
| $\phi_4 = -\ 0.442$ | $\phi'_4 = +19.703$ |   | $\phi_{IV} = +19.261$ |
|   |   | $\phi_{sIV,V} = +\ 6.177$ |   |
| $\phi_5 = -13.525$ | $\phi'_5 = +10.007$ |   | $\phi_V = -\ 3.518$ |

The air space $s_{IV,V}$ on the image side of the diaphragm possesses according to the invention the shape of a meniscus-shaped divergent lens which operates dioptrically as an air lens having positive power of +6.177 diopters, which is more than 60% of the total power of the lens of Example 2.

From the foregoing it is evident that in the case of Example 2 the powers of the strongest optical surfaces $R_1$, $R_2$ and $R'_2$ of the front group A are so dimensioned that, in absolute value, they increase progressively toward the diaphragm approximately in the proportion 1:2:3.

In the rear group C the relation of powers between the dioptrically most important surfaces in the vicinity of the diaphragm and those remote from the diaphragm is established in the order of magnitude of 2 to 1, since in round numbers $\phi_3/\phi_5 \cong 27/13.5$ and since $\phi'_4/\phi'_5 \cong 20/10$. In this connection the surface power $\phi'_5$ is so dimensioned as to be approximately equal to the equivalent power of the entire objective.

Here, consistently with the invention:

$$0.9\Phi < \phi_1 < 1.5\Phi$$

Consequently, taking $\phi_1$ equal to unity and upon application of a suitable range of values, the following rules for distribution of the powers of these strongest surfaces may be developed:

$$1.6\phi_1 < \phi_2 < 2.4\phi_1$$
$$2.5\phi_1 < -\phi'_2 < 3.5\phi_1$$
$$1.6\phi_5 < \phi_3 < 2.4\phi_5$$
$$1.6\phi'_5 < \phi'_4 < 2.4\phi'_5$$
$$0.75\Phi < \phi'_5 < 1.25\Phi$$
$$0.75\Phi < (\phi_{III} + \phi_{IV} + \phi_V) < 1.25\Phi$$

In terms of the equivalent focal length as a dimensional unit and in round numbers the form of this example can be given as follows:

| | |
|---|---|
| $R_1 = + .60 f$ | |
| $R'_1 = +1.6 f$ | $s_{I,II} \cong .1\ f$ |
| $R_2 = + .34 f$ | $s_{I,II} < .05 f$ |
| $R'_N = +1.0\ f$ | $t_2 \cong .1\ f$ |
| $R_N = +1.3\ f$ | $s_{2,'2} < .1\ f$ |
| $R'_2 = + .21 f$ | $t'_2 \cong .05 f$ |
| Diaphragm | $s_{II,III} \cong .25 f$ |
| $R_3 = - .22 f$ | $t_3 < .05 f$ |
| $R'_3 = - .28 f$ | $s_{III,IV} < .05 f$ |
| $R_4 = $ large | $t_4 \cong .1\ f$ |
| $R'_4 = - .36 f$ | $s_{IV,V} \cong .05 f$ |
| $R_5 = - .45 f$ | $t_5 < .05 f$ |
| $R'_5 = - .60 f$ | |

In Example 2, the speed of the lens has been increased beyond that of Example 1 to $f/1.9$ concurrently with a further reduction in the zonal departures from the sine coincidence condition, this departure now amounting to only $\delta_{SCO} = 45.4$ A for the zone of maximum spherical aberration at an incident ray height of $h_1 = 0.19878\ f$.

This second example is distinguished by an unusually fine correction in the lateral chromatic errors in the edge portions of the field. Thus the lateral chromatic difference between the yellow light of the helium $d$ line of 5876 Angstroms and the violet $g$ line of mercury of 4358 Angstroms is, for a yellow principal ray passing through the diaphragm at an inclination of $\bar{w} = 30°, 27', 23.5''$ only $$\delta y'_{g-d} = -2.93\ A$$

This chromatic error is the difference in the radial separations from the optical axis, in the Gaussian plane, of the differently colored image points of an object at infinity. This means that for a chief ray of white light and of this inclination incident on the objective of Example 2 from the object side, its violet component will pass through the Gaussian plane at an altitude $y'_g$ from the axis which is only 29.3 millionths parts of the equivalent focal length less than the corresponding altitude $y'_d$ of the yellow component of the same ray.

The third example of the lens of the invention to be described presents an objective of relative aperture $f/1.8$ and of 100 mm. focal length. Correspondingly all radii, thicknesses and spaces are given in millimeters.

Example 3

(All dimensions in millimeters)

[Equivalent focal length $f = 100$ mm. Relative aperture $f/1.8$]

| Component | Lens | $n$ | $\nu$ | Radii | Thickness $t$ or Spacing $s$ |
|---|---|---|---|---|---|
| I | $L_1$ | 1.7170 | 47.9 | $R_1 = + 60.3914$ | $t_1 = 9.1902$ |
| | | | | $R'_1 = +163.8015$ | $s_{I,II} = 0.1081$ |
| II | $L_2$ | 1.69347 | 53.5 | $R_2 = + 34.6513$ | $t_2 = 9.1902$ |
| | | | | $R'_N = +103.7950$ | $s_{2,'2} = 3.7842$ |
| | $L_3$ | 1.72742 | 28.4 | $R_N = +127.5814$ | $t'_2 = 4.3561$ |
| | | | | $R'_2 = + 21.6240$ | |
| | | | | Diaphragm | $s_{II,III} = 23.7864$ |
| | | | | $R_3 = - 22.7052$ | |
| III | $L_4$ | 1.6034 | 38.0 | $R'_3 = - 28.6517$ | $t_3 = 2.2921$ |
| | | | | | $s_{III,IV} = 0.1081$ |
| IV | $L_5$ | 1.7130 | 53.9 | $R_4 = -1621.797$ | $t_4 = 11.8932$ |
| | | | | $R'_4 = - 36.7607$ | $s_{IV,V} = 5.4060$ |
| V | $L_6$ | 1.6034 | 38.0 | $R_5 = - 45.1941$ | $t_5 = 1.7840$ |
| | | | | $R'_5 = - 59.0334$ | |

The distances $b_1$ and $b_2$ from the diaphragm plane to the vertices of the surfaces identified by the radii $R'_2$ and $R_3$ are respectively 14.4124 mm. and 9.3740 mm.

On the image side the paraxial back focal length $p'_0$ of this lens amounts to 51.023 mm. The radius $R'_5$ is in this example smaller than the front radius $R_1$.

In terms of the significant properties of the invention the lens of Example 3 presents the following characteristics with respect to shape factors, radii and surface powers:

| | | | |
|---|---|---|---|
| $\phi_1 = +11.872$ | $\phi'_1 = - 4.377$ | | $\phi_I = + 7.495$ |
| $\phi_2 = +20.013$ | $\phi'_N = - 6.681$ | $\phi_2 + \phi'_N = +13.332$ | $\phi_{II} = -14.606$ |
| $\phi_N = + 5.702$ | $\phi'_2 = -33.640$ | $\phi_N + \phi'_2 = -27.938$ | |
| $\phi_3 = -26.575$ | $\phi'_3 = +21.060$ | | $\phi_{III} = - 5.515$ |
| $\phi_4 = - 0.440$ | $\phi'_4 = +19.396$ | | $\phi_{IV} = +18.956$ |
| | | $\phi_{IV,V} = + 6.045$ | |
| $\phi_5 = -13.351$ | $\phi'_5 = +10.221$ | | $\phi_V = - 3.130$ |

The total power of the objective amounts again to 10 diopters, corresponding to its equivalent focal length of 100 mm.

The lens of Example 3 embodies by comparison with those of Examples 1 and 2 a simplification in that the two negative meniscus components III and V of the rear group are made of the same glass, viz., a flint glass of moderately strong index.

In the lens of Example 3 the reduction of the lateral chromatic errors in the edge portions of the field is transferred to the spectral range of shorter wave lengths. Trigonometric computations show that for a yellow principal ray having at the diaphragm plane the same inclination $\bar{\omega}$ of 30° 27' 23.5'' as that discussed in correction with Example 2, the lateral chromatic difference $$\delta y'_{g-e}$$

between the locations, in the Gaussian plane, of image points corresponding to the Fraunhofer $e$-line of 5461 Angstroms and the $g$-line of 4358 Angstroms amounts to only $+0.108$A, i. e. to 1.1 millionths parts of the focal length.

This valve indicates a significant advance for this particular branch of applied optics which can be achieved even in designs which embody, for ease of manufacture, the simplifications adopted in the case of Example 3— such simplifications customarily involving a limitation on the freedom from aberrations which can be achieved. This particular insensitivity of the new objective to glass variations, which for example makes possible the use in Example 3 of the same glass for components III and V, is a result of the fact that the dioptric composition of the lens can be very well balanced out, as a consideration of the preceding table of the power distribution among the components will show. This table further shows that in the rear group the sum $\phi_{III} + \phi_{IV}$ of the surface powers of the components III and IV is approximately compensated by the power $\phi_5$ of the divergent concave surface $R_5$. Consequently, the sum of the surface powers of the entire rear group is in practice determined by the surface power $\phi'_5$ of the last surface $R'_5$ alone. In terms of Example 3, $\phi_{III} \cong -5.15$ and $\phi_{IV} \cong +18.9$. Consequently the sum of the surface powers of these two components is $+13.4$ while $\phi_v \cong -13.4$ so that $\phi_5$ almost completely compensates $\phi_3 + \phi_4$, with the result that $\phi_{III} + \phi_{IV} + \phi_5 \cong 0$. Consequently the sum of the surface powers of the complete rear group is dependent substantially only on the dimensioning of the last surface $R'_5$ whose power here is of the order of magnitude of the power of the entire objective, i. e. 10 diopters.

By the arrangement of the last air space $s_{IV,V}$ of the rear component as a convergent air lens in the shape of a negative meniscus in accordance with the invention, it is possible to achieve dioptrically very effective differences between the intersection heights at the surfaces $R'_4$ and $R_5$ which limit this air space. These differences in intersection height in the ray passage between $R'_4$ and $R_5$ operate on a convergent ray path and increase with the lens spacing $s_{IV,V}$ which constitutes the axial thickness of this air lens. When the value of $s_{IV,V}$ falls below about 2% of the equivalent focal length, there appears a corresponding decline in the effectiveness of these differences in intersection heights. On the other hand for spacings $s_{IV,V}$ of from 10–20% of the focal length, objectives according to the invention are not readily accommodated in numerous present-day camera designs since an increase of this air space not only increases the length of the objective but also decreases its back focal distance.

In the numerical examples which have been discussed regard has been had for this question of constructional suitability of the lens to incorporation into photographic cameras, and the axial thickness of this air lens has been held to some 5% of the equivalent focal length. At this level the operation of this highly effective air lens is still so considerable that achievement of the high degree of correction herein described is attainable without imposing any neglect of other aberrations. Consequently the objective of Example 3 is also a genuine anastigmat, in which the astigmatism for a chief ray inclined to the axis of $\omega_0=21.8350°$ on the object side of the system is exactly zero. Here the two coincident astigmatic focal points depart from the Gaussian image plane in the undercorrected direction by only $16.2 \times 10^{-5}$ of the focal length. Thus the mean field curvature here amounts to only 162 millionths of the equivalent focal length.

This very well balanced reduction of abberations in the edge field is however not attained at the price of neglect of the image quality in the central field. On the contrary the lens of Example 3 is rather, with respect to correction of spherical aberration of back focal distances and focal lengths, much improved over the objectives of the prior art including that of slower relative aperture. This advance was made possible by virtue of the fact that the new objectives of the invention make it possible for the lens designer to give to the residual spherical aberrations in focal distances and focal lengths two inflection points. Hence in contrast to the normal course of correction in which there is only one point of zero aberration for rays of finite height of incidence, there are in the lens of Example 3 two ray heights for which the spherical aberrations are exactly zero.

In the appended Fig. 2 this state of correction of the lens of Example 3 is represented, on the basis of data obtained from ray tracing. In this figure the curves D and E represent respectively the variation in back focal distance and in focal length, according to the modification to the scheme of representation of von Rohr proposed by W. Merte. The heights of evidence on the first surface are indicated as ordinates and the abscissae represent the aberration values. Although the scales for the abscissae and ordinates are different, the unit of measure in both cases is 1 mm.

In view of the extraordinarily complete spherical correction of the marginal rays, which are precisely those which are of greatest importance, the portion of the curves of Fig. 2 indicated in Fig. 2 by the bracket F is shown at greatly increased scale in Fig. 3. In Fig. 3 the left hand scale of ordinates gives intercept heights in millimeters, as in Fig. 2. The appurtenant relative apertures are given adjacent thereto. An additional scale of ordinates $h_1^2$ is given at the right. Since the intensity is a function of the square of the aperture, the right hand scale of ordinates permits reading the residual aberrations as a function of the intensity contribution.

Fig. 3 shows in a striking manner the very high degree of spherical correction which is achieved, this state being indeed such that the fine scale representation of von Rohr and Merte is insufficient thereto and must hence be supplanted by a greatly magnified representation. It also shows clearly the improvement obtained in the residual departures from the sine coincidence condition. In the lens of Example 3 the sine coincidence condition is exactly fulfilled for a height $h_1$ of 25.09 mm. or $0.2509\,f$ ($h_1^2=629.5$). The spherical aberration of the back focal distances is exactly corrected for two heights $h_1=0.24208\,f$ and $h_1=0.27423\,f$, and the spherical aberration of the focal length is likewise exactly corrected for two heights $h_1=0.23174\,f$ and $h_1=0.26325\,f$.

While the invention has been described herein in terms of a number of preferred embodiments, various changes may be made therein without departing from the scope of the invention, which is set forth in the appended claims.

I claim:

1. A high speed optical objective system of modified Gaussian type comprising, from front to back, and ahead of the diaphragm position, a positive meniscus component and a negative doublet component, and, behind the diaphragm position, a first negative meniscus component, a positive component of unequal surface curvatures, and a second negative meniscus component, both surfaces of all of said components being concave toward the diaphragm position, the air spaces enclosed between the components behind the diaphragm position having the shape of negative lenses, the sum of the radii of the positive meniscus component being between 1.55 and 3.1 times the equivalent focal length of the system, the sum of the radii of the surfaces limiting the air space between the positive component of unequal curvatures and the second negative meniscus component being between $-.5$ and $-1.2$ times the said equivalent focal length, and the sum of the radii of the second negative meniscus component being between $-.65$ and $-1.65$ times the said equivalent focal length.

2. A high speed optical objective system of modified Gaussian type comprising, from front to back, and ahead of the diaphragm position, a positive meniscus component and a negative doublet component, and, behind the diaphragm position, a first negative meniscus component, a positive component of unequal surface curvatures, and a second negative meniscus component, both surfaces of all of said components being concave toward the diaphragm position, the air spaces enclosed between the components behind the diaphragm position having the shape of negative lenses, the shape factors $\delta_I$, $\delta_{IV,V}$ and $\delta_V$ defined respectively for the positive meniscus component, for the component comprising the air space between the positive component of unequal curvatures and the second negative meniscus component, and for the second negative meniscus component as the ratio $$\sigma = \frac{R'+R}{R'-R}$$

in which $R$ is the front and $R'$ is the rear radius of the component in question conforming to the following inequalities:

$$+1.50 < \delta_I < +3.0$$
$$+2.0 < \delta_{IV,V} < +20.0$$
$$+4.0 < \delta_V < +10.0$$

3. An optical objective system according to claim 1 in which the radii $R'_3$, $R'_4$, $R'_5$ of the rear surfaces of the first negative meniscus component, positive component of unequal curvatures and second negative meniscus component respectively conform to the following inequalities:

$RI_3 < R'_4 < R'_5$
$1.0R'_3 < R'_4 < 1.8R'_3$
$1.5R'_3 < R'_5 < 3.3R'_3$.

4. An optical objective system according to claim 3 in which the radii R'₂ of the rear surface of the doublet and R₅ of the front surface of the second negative meniscus component conform to the following inequality:

$$1.25R'_2 < -R_5 < 3R'_2$$

5. An optical objective system according to claim 2 in which the radii R₁ of the front surface of the positive meniscus component, R₂ of the front surface of the doublet and R'₂ of the rear surface of the doublet conform to the following inequalities:

$$1.50 < \frac{R_1}{R_2} < 2.50$$

$$2.33 < \frac{R_1}{R'_2} < 3.33$$

6. A high speed optical objective system of modified Gaussian type comprising, from front to back, and ahead of the diaphragm position, a positive meniscus component and a negative doublet component, and, behind the diaphragm position, a first negative meniscus component, a positive component of unequal surface curvatures, and a second negative meniscus component, both surfaces of all of said components being concave toward the diaphragm position, the air spaces enclosed between the components behind the diaphragm position having the shape of negative lenses, the sums $\phi_I$ and $\phi_V$ of the surface powers of the components numbered from front to back being related to the equivalent power $\Phi$ of the system as follows:

$0.5\Phi < \phi_I < 1.0\Phi$
$1.0\Phi < -\phi_{II} < 2.0\Phi$
$0.3\Phi < -\phi_{III} < 0.8\Phi$
$1.4\Phi < \phi_{IV} < 2.8\Phi$
$0.2\Phi < -\phi_V < 0.7\Phi$ 7. A high speed optical objective system of modified Gaussian type comprising, from front to back, a positive meniscus component, a negative doublet component including a front positive element and a rear negative element, a first negative meniscus component, a positive component of unequal surface curvatures, and a second negative meniscus component, the radii of curvature R₁, R'₁ of the positive meniscus component, R₂, R'ₙ, Rₙ and R'₂ of the doublet component, and R₃, R'₃, R₄, R'₄, R₅ and R'₅ of the other said components conforming to the following relations:

$2.0\ R_1 < R'_1 < 5.0R_1$
$.40\ R_1 < R_2 < .667R_1$
$R_1 < \pm R'_{N,N} < \infty$
$.30\ R_1 < R'_2 < .4286R_1$
$.30\ R_1 < -R_3 < .48R_1$
$.36\ R_1 < -R'_3 < .60R_1$
$3.3\ R_1 < \pm R_4 < \infty$
$+.36\ R_1 < -R'_4 < .75R_1$
$+.36\ R_1 < -R_5 < R_1$
$.75\ R_1 < -R'_5 < 1.50R_1$ 8. A high speed optical objective system of modified Gaussian type comprising, from front to back, a positive meniscus element L₁, a negative doublet including a front positive element L₂ and a negative rear element L₃, a first positive meniscus element L₄, a positive element L₅ of unequal surface curvatures, and a second negative meniscus element L₆, the radii of the surfaces and the thicknesses and spacings of said elements being related to the radius R₁ of the front surface of L₁ substantially as follows:

| Element | Radii | Thickness t or Spacing s |
|---|---|---|
| L₁ | $R_1 = +1\ R_1$ | $t_1 \cong 0.15\ R_1$ |
|    | $R'_1 = +2.7\ R_1$ | $s_{I,II} < 0.1\ R_1$ |
| L₂ | $R_2 = + .57\ R_1$ | $t_2 \cong 0.15\ R_1$ |
|    | $R'_N = +1.7\ R_1$ | $s_{2,3} < 0.1\ R_1$ |
| L₃ | $R_N = +2.1\ R_1$ | $t'_3 < 0.1\ R_1$ |
|    | $R'_2 = + .36\ R_1$ | $s_{II,III} \cong 0.4\ R_1$ |
| L₄ | $R_3 = - .38\ R_1$ | $t_3 < 0.1\ R_1$ |
|    | $R'_3 = - .48\ R_1$ | $s_{III,IV} < 0.1\ R_1$ |
| L₅ | $R_4 = nR_1$ where n is a large number | $t_4 \cong 0.2\ R_1$ |
|    | $R'_4 = - .60\ R_1$ | $s_{IV,V} < 0.2\ R_1$ |
| L₆ | $R_5 = - .75\ R_1$ | $t_5 < 0.1\ R_1$ |
|    | $R'_5 = -1.0\ R_1$ | |

9. A high speed optical objective system of the modified Gaussian type comprising, from front to back a positive meniscus element L₁, a negative doublet including a front positive element L₂ and a negative rear element L₃, a first positive meniscus element L₄, a positive element L₅ of unequal surface curvatures, and a second negative meniscus element L₆, the said system conforming substantially to the following conditions:

| Element | Index | Abbe Number | Radii in inches | Thickness t or Spacing s in inches |
|---|---|---|---|---|
| L₁ | 1.7170 | 47.9 | $R_1 = + 1.0000$ | $t_1 = 0.15245$ |
|    |        |      | $R'_1 = + 2.7092$ | $s_{I,II} = 0.00175$ |
| L₂ | 1.6935 | 53.5 | $R_2 = + 0.5744$ | $t_2 = 0.15245$ |
|    |        |      | $R'_N = + 1.7230$ | $s_{2,3} = 0.06352$ |
| L₃ | 1.7274 | 28.4 | $R_N = + 2.1169$ | $t'_2 = 0.07210$ |
|    |        |      | $R'_2 = + 0.3589$ | $s_{II,III} = 0.39384$ |
| L₄ | 1.6034 | 38.0 | $R_3 = - 0.3762$ | $t_3 = 0.03811$ |
|    |        |      | $R'_3 = - 0.4756$ | $s_{III,IV} = 0.00175$ |
| L₅ | 1.7130 | 53.9 | $R_4 = -27.060$ | $t_4 = 0.19691$ |
|    |        |      | $R'_4 = - 0.6071$ | $s_{IV,V} = 0.08957$ |
| L₆ | 1.6034 | 42.5 | $R_5 = - 0.7484$ | $t_5 = 0.02954$ |
|    |        |      | $R'_5 = - 1.0116$ | |

10. A high speed optical objective system of modified Gaussian type comprising, from front to back, a positive meniscus element L₁, a negative doublet including a front positive element L₂ and a negative rear element L₃, a first positive meniscus element L₄, a postive element L₅ of unequal surface curvatures, and a second negative meniscus element L₆, the radii of the surfaces in said system and the thicknesses and spacings of the elements thereof being related to the equivalent focal length $f$ of the system as follows:

| Element | Radii | Thickness $t$ or Spacing $s$ |
|---|---|---|
| $L_1$ | $R_1 = +.60f$ <br> $R'_1 = +1.6f$ | $t_1 \cong .1f$ <br> $s_{I,II} < 0.5f$ |
| $L_2$ | $R_2 = +.34f$ <br> $R'_N = +1.0f$ | $t_2 \cong .1f$ <br> $s_{2,'2} < .1f$ |
| $L_3$ | $R_N = +1.3f$ <br> $R'_2 = +.21f$ | $t'_2 \cong .05f$ <br> $s_{II,III} \cong .25f$ |
| $L_4$ | $R_3 = -.22f$ <br> $R'_3 = -.28f$ | $t_3 < .05f$ <br> $s_{III,IV} < .05f$ |
| $L_5$ | $R_4 = nf$ where $n$ is a large number <br> $R'_4 = -.36f$ | $t_4 \cong .1f$ <br> $s_{IV,V} \cong .05f$ |
| $L_6$ | $R_5 = -.45f$ <br> $R'_5 = -.60f$ | $t_5 < .05f$ |

11. A high speed optical objective system of the modified Gaussian type comprising, from front to back a positive meniscus element $L_1$, a negative doublet including a front positive element $L_2$ and a negative rear element $L_3$, a first positive meniscus element $L_4$, a positive element $L_5$ of unequal surface curvatures, and a second negative meniscus element $L_6$, the said system conforming substantially to the following conditions:

| Element | Index | Abbe Number | Radii in mm. | Thickness $t$ or Spacing $s$ in mm. |
|---|---|---|---|---|
| $L_1$ | 1.7170 | 47.9 | $R_1 = + 59.606$ <br> $R'_1 = +161.485$ | $t_1 = 9.087$ <br> $s_{I,II} = 0.104$ |
| $L_2$ | 1.6910 | 54.8 | $R_2 = + 34.105$ <br> $R'_N = +102.703$ | $t_2 = 9.021$ <br> $s_{2,'2} = 3.786$ |
| $L_3$ | 1.7274 | 28.4 | $R_N = +126.178$ <br> $R'_2 = + 21.393$ | $t'_2 = 4.297$ <br> $s_{II,III} = 23.475$ |
| $L_4$ | 1.6034 | 38.0 | $R_3 = - 22.424$ <br> $R'_3 = - 28.350$ | $t_3 = 2.272$ <br> $s_{III,IV} = 0.104$ |
| $L_5$ | 1.7130 | 53.9 | $R_4 = -1612.96$ <br> $R'_4 = - 36.188$ | $t_4 = 11.737$ <br> $s_{IV,V} = 5.339$ |
| $L_6$ | 1.6034 | 42.5 | $R_5 = - 44.612$ <br> $R'_5 = - 60.297$ | $t_5 = 1.761$ |

12. A high speed optical objective system of the modified Gaussian type comprising, from front to back, a positive meniscus element $L_1$, a negative doublet including a front positive element $L_2$ and a negative rear element $L_3$, a first positive meniscus element $L_4$, a positive element $L_5$ of unequal surface curvatures, and a second negative meniscus element $L_6$, the said system conforming substantially to the following conditions:

| Element | Index | Abbe Number | Radii in mm. | Thickness $t$ or Spacing $s$ in mm. |
|---|---|---|---|---|
| $L_1$ | 1.7170 | 47.9 | $R_1 = + 60.3914$ <br> $R'_1 = + 163.8015$ | $t_1 = 9.1902$ <br> $s_{I,II} = 0.1081$ |
| $L_2$ | 1.69347 | 53.5 | $R_2 = + 34.6513$ <br> $R'_N = + 103.7950$ | $t_2 = 9.1902$ <br> $s_{2,'2} = 3.7842$ |
| $L_3$ | 1.72742 | 28.4 | $R_N = + 127.5814$ <br> $R'_2 = + 21.6240$ | $t'_2 = 4.3561$ <br> $s_{II,III} = 23.7864$ |
| $L_4$ | 1.6034 | 38.0 | $R_3 = - 22.7052$ <br> $R'_3 = - 28.6517$ | $t_3 = 2.2921$ <br> $s_{III,IV} = 0.1081$ |
| $L_5$ | 1.7130 | 53.9 | $R_4 = -1621.797$ <br> $R'_4 = - 36.7607$ | $t_4 = 11.8932$ <br> $s_{IV,V} = 5.4060$ |
| $L_6$ | 1.6034 | 38.0 | $R_5 = - 45.1941$ <br> $R'_5 = - 59.0334$ | $t_5 = 1.7840$ |

References Cited in the file of this patent

UNITED STATES PATENTS

| | | |
|---|---|---|
| 2,084,309 | Bertele | June 22, 1937 |
| 2,106,077 | Tronnier | Jan. 18, 1938 |
| 2,649,023 | Tronnier | Aug. 18, 1953 |
| 2,670,659 | Tronnier | Mar. 2, 1954 |
| 2,677,989 | Tronnier | May 11, 1954 |

FOREIGN PATENTS

| | | |
|---|---|---|
| 439,556 | Germany | Jan. 13, 1927 |
| 398,307 | Great Britain | Sept. 14, 1933 |